United States Patent
Oe et al.

(10) Patent No.: US 6,733,382 B2
(45) Date of Patent: May 11, 2004

(54) GAME DEVICE, GAME DEVICE CONTROL METHOD AND INFORMATION STORAGE MEDIUM

(75) Inventors: Osamu Oe, Sapporo (JP); Kazuyoshi Takehara, Sapporo (JP); Akihide Tanimura, Sapporo (JP); Yasukazu Majima, Sapporo (JP)

(73) Assignee: Konami Corporation, Tokyo (JP)

( * ) Notice: Subject to any disclaimer, the term of this patent is extended or adjusted under 35 U.S.C. 154(b) by 425 days.

(21) Appl. No.: 09/833,564

(22) Filed: Apr. 13, 2001

(65) Prior Publication Data

US 2001/0031653 A1 Oct. 18, 2001

(30) Foreign Application Priority Data

Apr. 14, 2000 (JP) .................................... 2000-113797

(51) Int. Cl.⁷ .................................................. A63F 9/24
(52) U.S. Cl. .......................................................... 463/1
(58) Field of Search ................................ 463/1, 7–8, 9, 463/16, 29, 30, 31, 36, 40–43; 273/148 R, 148 B, 459–461, 440, 440.1, 454; 700/91–92

(56) References Cited

FOREIGN PATENT DOCUMENTS

TW         232059         10/1994

OTHER PUBLICATIONS

Gameboy Kanpeki Koryaku Series 34 Picket Monster Aka, Midori, Ao, Hissyo Koryakuhou, Futabasha Publishers Ltd., Oct. 15, 1997, First issue, p. 16.

Tokyo Game Show Walker, Kadokawa Shoten Publishing Co., Ltd., Nov. 1, 1998, p. 98.

*Primary Examiner*—Mark Sager
(74) *Attorney, Agent, or Firm*—Sughrue Mion, PLLC

(57) ABSTRACT

A function for exchanging a game item for other unpredictable game item is provided so that a game is given an unpredictable aspect. For game item exchange, a bottle mail function is provided. In order to apply the bottle mail function, two game devices are connected for communication via a communication cable, and so on; one of the game items owned by its own game character is designated; and game item specifying information specifying the designated game item is exchanged between two game devices. While using the game item specified by the game item specifying information obtained from the other game device as an exchange source game item, an exchange object game item correlated with that exchange source game item is read from the item exchange table. The player character then owns the game item read in the place of the game item originally designated for the exchange.

10 Claims, 3 Drawing Sheets

ITEM EXCHANGE TABLE

| EXCHANGE SOURCE ITEM | EXCHANGE OBJECT ITEM |
|---|---|
| SEED | WEED |
| WEED | FLOWER |
| FLOWER | DRIED FLOWER |
| EGG | CHICK |
| CHICK | CHICKEN |

GAME DEVICE, GAME DEVICE CONTROL METHOD AND INFORMATION STORAGE MEDIUM

BACKGROUND OF THE INVENTION

1. Field of the Invention

The present invention relates to a game device, a game device control method, and an information storage medium. In particular, the present invention relates to a game device having a function for exchanging a game item owned by a game character for other game item, and a game device control method and an information storage medium for the item exchange.

2. Description of the Related Art

Popular game software may be associated with a role playing game (RPG) and so on, in which a game character having various game items e.g., a weapon, a ward, and so on, attempts to clear a game using such game items. According to some of such game software, two game devices, such as his own and his friend's, may be connected for communication via, for example, a communication cable so that game items can be exchanged between the connected game devices. With this arrangement, a game character in one game device can possess not only a game item which the game character legitimately obtained or purchased in a game space but also other new game item. This can diversify the way of enjoying the game.

However, the above-mentioned conventional game software supports only simple exchange of game items with a friend, in which the player can know what he will obtain in exchange before the exchange actually takes place. That is, according to such game software, only items approved by the players are exchanged.

SUMMARY OF THE INVENTION

The present invention has been conceived in the above situation, and aims to provide a game device having a function for exchanging a game item for an unpredictable game item so that the game is given an unpredictable aspect. The present invention also aims to provide a game device control method and an information storage medium to achieve such a game device.

In order to achieve the above object, according to one aspect of the present invention, there is provided a game device, comprising game item storage means for storing game items owned by a game character; state judgement means for judging whether or not a game is in a game item exchange state; game item selection means for selecting, in response to a judgement result that the game is in a game item exchange state, at least one of the game items stored in the game item storage means; table storage means for storing a game item exchange table in which an exchange source game item corresponds to at least one exchange object game item; exchange object game item determination means for determining at least one exchange object game item according to the game item exchange table; and game item exchange means for storing the at least one exchange object game item determined in the game item storage means in a place of the at least one game item selected by the game item selection means.

According to another aspect of the present invention, there is provided a control method for a game device, comprising a game item storing step of storing game items owned by a game character in a memory; a state judging step of judging whether or not a game is in a game item exchange state; a game item selecting step of selecting, in response to a judgement result that the game is in a game item exchange state, at least one of the game items stored in the memory; an exchange object game item determining step of determining at least one exchange object game item according to a game item exchange table in which an exchange source game item corresponds to at least one exchange object game item; and a game item exchanging step of storing the at least one exchange object game item in the memory in a place of the at least one game item selected in the game item selecting step.

According to still another aspect of the present invention, there is provided an information storage medium storing a program for having a computer to execute a game item storing step of storing game items owned by a game character in a memory; a state judging step of judging whether or not a game is in a game item exchange state; a game item selecting step of selecting, in response to a judgement result that the game is in a game item exchange state, at least one of the game items stored in the memory; an exchange object game item determining step of determining at least one exchange object game item according to a game item exchange table in which an exchange source game item corresponds to at least one exchange object game item; and a game item exchanging step of storing the at least one exchange object game item in the memory in a place of the at least one game item selected in the game item selecting step.

As described above, according to the present invention, game items are stored in the game item storage means (e.g., a memory), and at least one of the stored game items is selected upon determination of a game item exchange state. Here, a game item exchange table is pre-provided. The game item exchange table is a table in which an exchange source game item corresponds to at least one exchange object game item. Therefore, at least one exchange object game item is determined according to the game item exchange table, and stored in the place of the at least one game item selected in the storage means (e.g., a memory). This arrangement allows a player without the knowledge of the content of the game item exchange table to exchange the selected game item for other unpredictable game item, contributing to giving an unpredictable aspect to the game thereby making the game more attractive.

The game device according to the present invention may further comprise connection judgement means for judging whether or not connection for communication is established with other game device. In this game device, the state judgement means judges whether or not a game is in a game item exchange state based on a result of judgement made by the connection judgement means. This arrangement allows counting connection with other device for communication as one of the conditions to conduct game item exchange. Therefore, connection with other game device may be encouraged so that the player can enjoy a sense of solidarity with his friend.

Still further, the exchange object game item determination means may include game item specifying information obtaining means for obtaining, from the other game device, game item specifying information specifying at least one game item, and determine, using the at least one game item specified by the game item specifying information as at least one exchange source game item, at least one of the exchange object game items corresponding to the at least one game exchange source game item recorded in the game item exchange table, as the at least one exchange object game item.

In the above, the game item specifying information is obtained from other game device so that at least one game item specified by the game item specifying information is used as at least one exchange source game item. At least one of the exchange object game items corresponding to the at least one exchange source game item according to the game item exchange table is selected as at least one actual exchange object game item. This arrangement allows the game item specified by the game item specifying information to be exchanged for other unpredictable game item.

Yet further, the exchange object game item determination means may determine, using the at least one game item selected by the game item selection means as at least one exchange source game item, at least one of the exchange object game items corresponding to the at least one exchange source game item recorded in the game item exchange table, as the at least one exchange object game item.

In the above, the game item selected by the game item selection means is used as an exchange source game item, and at least one of the exchange object game items corresponding to the exchange source game item according to the game item exchange table is selected as an actual exchange object game item. This arrangement allows a game item selected by, for example, a player to be exchanged for other unpredictable game item.

Yet further, the state judgement means may judge that the game device is in a game item exchange state when the game device is connected to other game device for communication, and the other game device is in a game item exchange state. This arrangement allows the player of the game device to exchange game items together with the player of the other game device, and resultantly contributes to enhancing the player's sense of solidarity with the player of other game device.

Yet further, the exchange object game item determination means may include game item exchange time counting means for counting a number of times where the game item exchange means exchanges game items, and determine the at least one exchange object game item based on the number of times. This arrangement allows determination of an exchange object game item based on the number of exchange times. As a result, for a large number of exchanges, a game item which is unpredictable to an extent commensurating with that large number of exchanges can be set as an exchange object game item. This can contribute to imparting a further unpredictable aspect to the game.

Yet further, the exchange object game item determination means may include random number generation means for generating a random number, and determine at least one exchange object game item based on the random number generated. This arrangement enables to determine a still unpredictable exchange object game item.

BRIEF DESCRIPTION OF THE DRAWINGS

The above and the other objects, features, and advantages of the present invention, will become further apparent from the following description of the preferred embodiment taken in conjunction with the accompanying drawings wherein.

DESCRIPTION OF THE PREFERRED EMBODIMENTS

The entire disclosure of the corresponding Japanese application 2000-113797 filed on Apr. 14, 2000 including specification, claims, drawings and summary are incorporated herein by reference.

In the following, preferred embodiments of the present invention will be described in detail with reference to the accompanying drawings.

Figure 1:
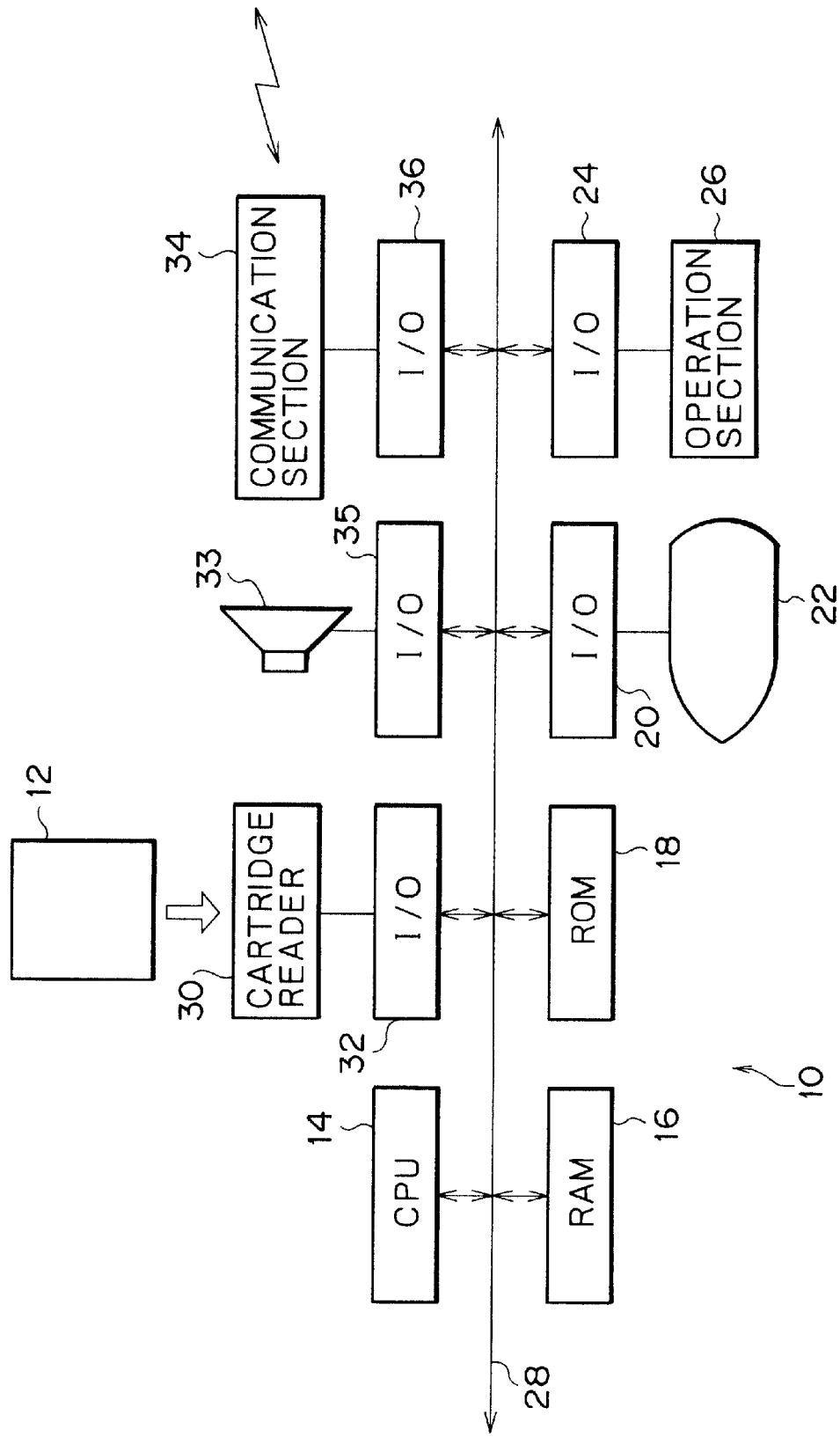
FIG. 1 is a diagram showing a structure of a game device according to a preferred embodiment of the present invention.

FIG. 1 is a diagram showing a structure of a game device according to a preferred embodiment of the present invention. A game device 10 in the drawing is of a portable type, and realized by mounting a game cartridge 12 incorporating a ROM into a cartridge reader 30 so that the game device 10 reads a game program and game data stored in the ROM. Note that, although a game cartridge 12 is used here to provide a game program and game data to the game device 10, any information storage media, such as CD-ROM, DVD, and so on, may also be usable. Alternatively, a game program may be supplied to the game device 10 remotely via a communication network.

In the game device 10, a CPU 14, a RAM 16, a ROM 18, input/output interfaces 20, 24, 32, 35, 36 are mutually connected via a bus 28 allowing data exchange. The input/output interface 32 is additionally connected to the cartridge reader 30. The input/output interface 36 is additionally connected to a communication section 34. The input/output interface 35 is additionally connected to a speaker 33. The input/output interface 20 is additionally connected to a display 22. The input/output interface 24 is additionally connected to an operation section 26. All these items, as well as a battery, are accommodated in a single body, and driven by the battery, so that they can be carried.

The CPU 14 controls the respective sections of the game device 10 based on an operation system (OS) stored in the ROM 18 and a game program read from the game cartridge 12. The bus 28 is a data path through which addresses and data are exchanged between the respective sections in the game device 10. A game program and game data read from the game cartridge 12 are written into the RAM 16 upon necessity. The RAM 16 contains a work area for the CPU 14. The display 22 may comprise, for example, an LCD, and displays a game screen image prepared by the CPU 14. The speaker 33 outputs game music, sound effects, and so on, generated by the CPU 14.

The input/output interfaces 20, 24, 32, 35, 36 are interfaces for data exchange respectively with the display 22, the operation section 26, the cartridge reader 30, the speaker 33, and the communication section 34, as well as the CPU 14. The operation section 26 is an input means via which a player operates a game. The operation section 26 has a direction key, button A, button B, a start button, and so on. The cartridge reader 30 has a space for accommodating the game cartridge 12, and a signal input/output terminal formed at the deep end of the space. The game cartridge 12 inserted deep in the space allows signal exchange between the game cartridge 12 and the cartridge reader 30. The communication section 34 is connected, for example, via a communication cable for data exchange with other game device.

The technology described in the following enables to realize a role playing game, using the game device 10, in which a game character operated by a game player (a player character), can exchange his own game item for other unpredictable game item during playing the game. A function for exchanging a game item for other game item unpredictable to the player is referred to as a bottle mail function.

Figures 2, 3:
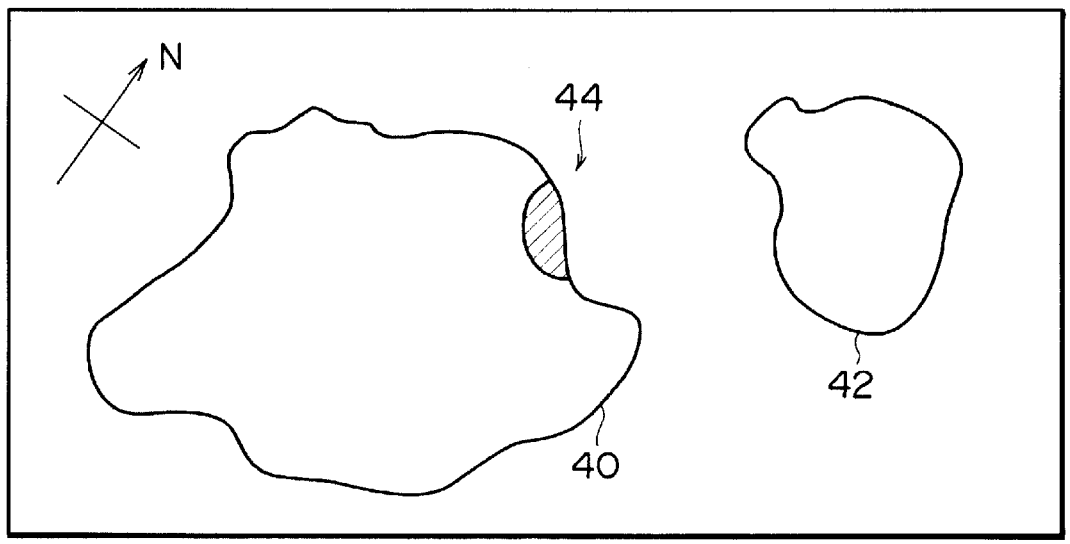
FIG. 2 is a diagram showing an exemplary game map.
FIG. 3 is a diagram showing an exemplary item exchange table.

FIG. 2 shows a game map used in the above mentioned role playing game. Adventure islands 40, 42 are the places for adventure by the player characters. The ultimate goal of the game is to clear various game events held in the adventure islands 40, 42, and to escape from the islands 40, 42. In the islands 40, 42, game items must be made best use of in order to clear a game event. An unnecessary game item is put in a bottle and released to a sea in the item exchange area 44. Thereupon, a game item unpredictable to the player will arrive in a bottle (a bottle mail function). This arrangement allows the player to exchange the player character's game item for other unpredictable game item. For game item exchange, the player first moves the player character to the item exchange area 44, using the operation section 26. The player then connects a communication cable to the communication section 34 for establishment of communication connection between his own game device 10 and other game device played by his friend and so on. Note that the other game device has an identical structure as that of the game device 10, as shown in FIG. 1, and is mounted with a game cartridge 12 storing an identical game program. In the following, one game device 10 is referred to as a game device 10a, while the other is referred to as a game device 10b. For game item exchange, game characters are moved to the item exchange areas 44 in the game devices 10a and 10b. The players of the game devices 10a and 10b respectively designate one of their player characters' game items using the operating sections 26. The designated items are put in respective bottles, and released to a sea. When releasing the bottles, data specifying a game item (game item specifying information) is exchanged between the two game devices 10a and 10b via the communication cable. In the game device 10a, the game item specified by the game item specifying information obtained from the game device 10b is used as an exchange source game item, and an exchange object game item correlated with the exchange source game item is read from the item exchange table. A bottle containing the game item read from the table then is cast ashore. Likewise, in the game device 10b, the game item specified by the game item specifying information obtained from the game device 10a is used as an exchange source game item, and an exchange object game item correlated with the exchange source game item is read from the item exchange table. The bottled game item read from the table then arrives. As described above, when a game item is released to a sea in a bottle in the game device 10a, an unpredictable game item specified based on the game item designated in the game device 10b arrives instead. The same happens on the game device 10b side. As described above, players can exchange their player characters' game items for other unpredictable game items.

FIG. 3 shows an exemplary item exchange table. The item exchange table is stored beforehand in the game cartridge 12, and read to the RAM 16 upon necessity. The item exchange table is a table in which an exchange source game item corresponds to an exchange object game item, and provides a corresponding exchange object game item upon designation of an exchange source game item. For example, when a "seed" is selected as an exchange source game item, a "weed" may be selected for an exchange object game item. Then, when the "weed" is selected as an exchange source game item, a "flower" may be selected as an exchange object game item. Generally, a more usable item in the game may be set as an exchange object game item rather than an exchange source game item. Therefore, both players can obtain more usable game items through the bottle mail function. It should be noted that the content of the item exchange table is unknown to the players, so that the players feel that their game items are exchanged for unpredictable game items. It should also be noted that, whereas only one exchange object game item is recorded in the item exchange table corresponding to an exchange source game item in the above, two or more corresponding exchange object game items may be recorded. In this case, one game item can be exchanged for two or more game items. Alternatively, some (e.g., one) of the plurality of exchange object game items may be selected based on a random number. In this case, an exchange source game item can be exchanged for a game item selected based on the random number. This arrangement allows an exchange source game item to be exchanged for a further unpredictable game item.

Figure 4:
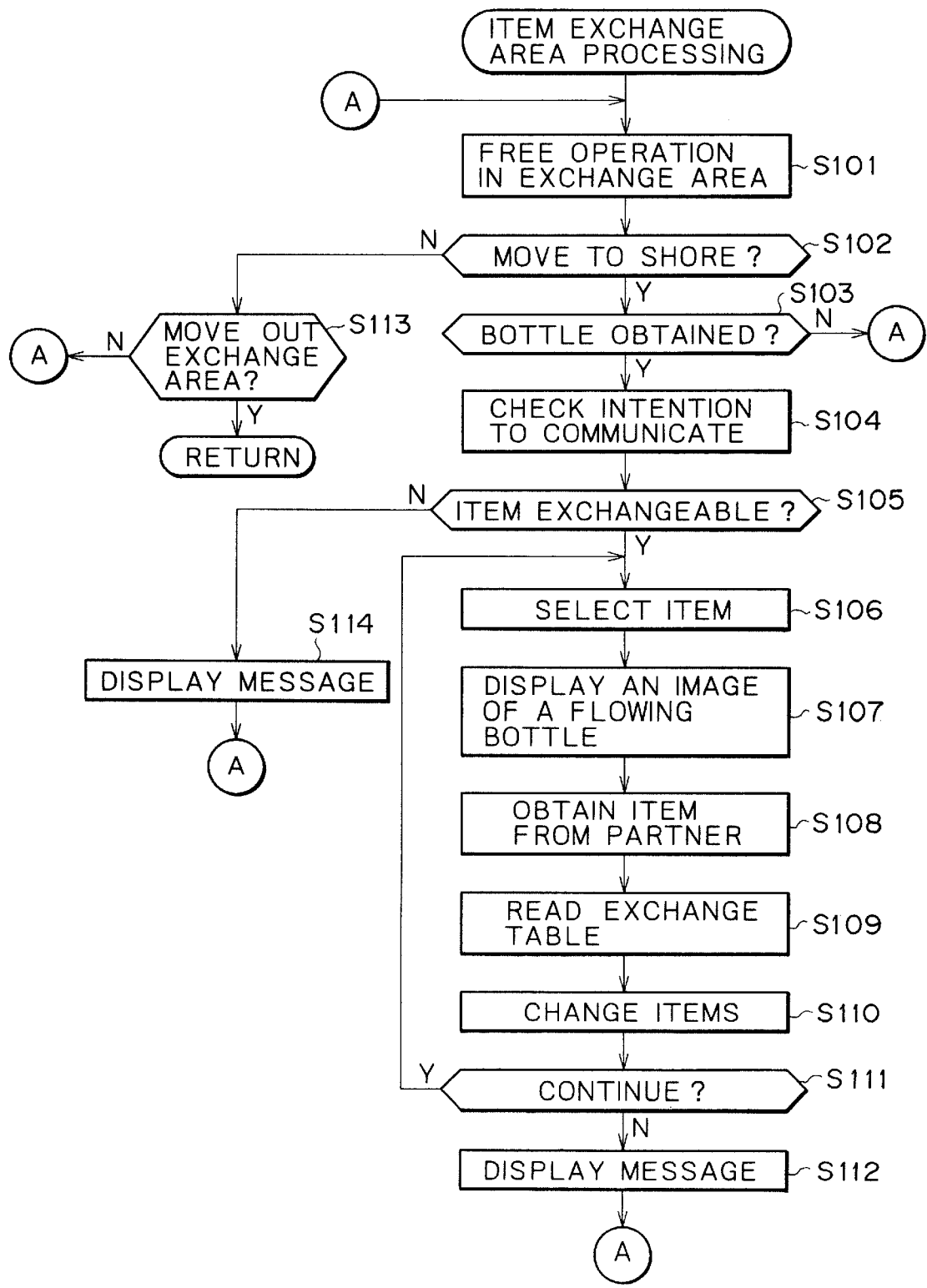
FIG. 4 is a flowchart explaining game processing applied in an item exchange area.

FIG. 4 is a flowchart explaining game processing executed on the game devices 10a and 10b, in particular, with a player character in the item exchange area 44. In the following, game processing applied in the game device 1a will be described, though identical game processing will be applied in the game device 10b.

As shown, in this game processing, a player character can be freely operated for movement in the item exchange area 44 (S101). Whether or not the player character has moved to the top of the rock at the center on the shore is determined (S102). When it has not, whether or not the player character has left the item exchange area 44 is determined (S113). When it has, the game processing in the item exchange area 44 is completed. On the other hand, when the player character has not left the item exchange area 44, free operation in the item exchange area 44 is continued (S101). Returning to S102, when it is determined that the player character has moved to the top of the rock on the shore in the item exchange area 44, it is then determined whether or not a bottle item, which is indispensable for the bottle mail function, has already been obtained (S103). A bottle item can be obtained at a predetermined place indicated in the game map, and a game item, such as a bottle item, owned by a player character is recorded in an item list. The item list is held in the RAM 16 during the game, and forwarded to the EEPROM in the game cartridge 12 at the end of the game in order to save the current state of the player. In the process at S103, whether or not a bottle item is included in the item list is determined. Should the bottle item be yet to be obtained, free operation in the item exchange area 44 is continued (S101). On the other hand, when a bottle item has already been obtained, whether or not the player is willing to hold communication is checked (S104). The check may be made based on the player's input operation via the operation section 2 after displaying, for example, a message, such as "You can release a bottle via communication. Do you want to?" on the display 22.

Subsequently, whether or not the game is in an item exchange state is judged (S105). Specifically, it is determined that the game is in an item exchange state when the following conditions are met. First, the players in the game devices 10a and 10b are both willing to communicate. This can be checked in the process at S104. Second, the player characters in the game devices 10a and 10b are both in the item exchange areas 44. Third, the game devices 10a and 10b are mutually connected for communication. It should be noted that the CPU 14 sometimes accesses the input/output interface 36 during a game to monitor whether or not a communication connection is established via the communication sections 34 between the game devices 10*a* and 10*b*. Fourth, the player characters in the game devices 10*a* and 10*b* both have bottle items and game items to be put in the bottle items (an exchange item). With these conditions met, it is determined that the game is in an item exchange state. On the other hand, when the game is not in the item exchange state, that fact is notified via the display 22 (S114), and free operation in the item exchange area 44 can be allowed again (S101). When the game is in an item exchange state, the player is then required to select a game item (S106). That is, the CPU 14 reads the item list from the RAM 16, shows it on the display 22, and waits for a selection input via the operation section 26. With an input received, the CPU 14 determines, based on the input, which game item the player designated. As described above one of the game items owned by the player character is selected. Thereafter, the CPU 14 controls the display 22 to display a screen image in which the bottle flows away through the sea and another bottle arrives from across the sea (S107). The CPU 14 obtains game item specifying information from the game device 10*b* (S108), and reads the item exchange table from the game cartridge 12 (S109). Using the game item specified by the item specifying information from the game device 10*b* as an exchange source game item, the CPU 14 finds an exchange object game item corresponding to the exchange source game item recorded in the game item exchange table. That exchange object game item is then registered to the item list of the player character of the game device 10*a*, while the game item selected at S106 is deleted from the item list (S110). As described above, game items are exchanged in the game device 10*a*. Subsequently, a message, such as "Do you want to release a bottle?", is displayed again in the display 22 to check whether or not the players are willing to continue using the bottle mail function (S111). This check is made in both of the game devices 10*a* and 10*b*. When players in the game devices 10*a* and 10*b* are both willing to continue using the bottle mail function, they are again requested to select a game item (S106). On the other hand, at least one of the players expresses his willing to stop using the bottle mail function, another message, such as "That's all for today", is shown on the display 22 (S112). The player characters are then allowed to move freely in the item exchange area 44 (S101).

According to the game device 10*a* and 10*b* described above, when two players connect their game devices 10*a*, 10*b* via a communication cable and designate game items, the designated game items can be exchanged for other unpredictable game items. With this arrangement, the game is given an unpredictable aspect, and resultantly becomes more attractive. Also, a screen image shown on the display 22 in which a bottle containing a game item flows away through the sea and another bottle containing another game item arrives from across the sea is effective to favorably dramatize the fact that game items are exchanged using an uncertain method such as bottle mailing. Further, as game items are exchanged based on an item exchange table and a game item specified by the opponent player is used as an exchange source game item, game item exchange can be carried out in a further unpredictable manner, as compared with a conventional simple exchange.

It should be noted that the present invention is not limited to the above-described preferred embodiment.

For example, whereas a game program and game data are stored in a game cartridge 12 and reproduced using a portable game device 10 in the above, various other types of information storage medium, such as CD-ROM, DVD, and so on, may be used instead. Moreover, any computers, such as a personal computer, which can read a game program and game data stored in an information storage medium and apply information processing based Ti on the content read, may be usable. Alternatively, a computer which can receive a game program and game data via a communication network, such as a portable telephone and a PDA (portable digital assistance), and apply information processing based on the information received, may be usable.

Further, whereas the game device 10*a* is connected to other game device 10*b* for communication so that game items can be exchanged between the connected game devices 10*a* and 10*b* in the above, game items can be exchanged within a single game device 10*a* or 10*b*. For example, an item exchange table is provided; the player designates a game item for use as an exchange source game item; an exchange object game item corresponding to that exchange source game item is read from the item exchange table; and the exchange object game item read is registered in the item list in the place of the originally designated game item. This also allows unpredictable game item exchange.

Still further, whereas a game item specified by game item specifying information from other game device 10*b* is used as an exchange source game item when using the item exchange table on the game device 10*a* side in the above, a game item selected by the player of the game device 10*a* may be used as an exchange source game item.

Yet further, the number of times where game items are exchanged through the bottle mail function may be counted, so that, when the number reaches a predetermined value, a game item may be exchanged to other still unpredictable game item. This encourages the player to use the bottle mail function repeatedly.

What is claimed is:

1. A game device, comprising:
   game item storage means for storing game items owned by a game character;
   state judgement means for judging whether or not a game is in a game item exchange state;
   game item selection means for selecting, in response to a judgement result that the game is in a game item exchange state, at least one of the game items stored in the game item storage means;
   table storage means for storing a game item exchange table in which an exchange source game item corresponds to at least one exchange object game item;
   exchange object game item determination means for determining at least one exchange object game item according to the game item exchange table; and
   game item exchange means for storing the at least one exchange object game item determined in the game item storage means in a place of the at least one of the game item selected by the game item selection means.

2. A game device according to claim 1, further comprising:
   connection judgement means for judging whether or not connection for communication is established with other game device,
   wherein
   the state judgement means judges whether or not the game is in a game item exchange state based on a result of judgement made by the connection judgement means.

3. A game device according to claim 2, wherein
   the exchange object game item determination means includes game item specifying information obtaining means for obtaining, from the other game device, game item specifying information specifying at least one game item, and determines, using the at least one game item specified by the game item specifying information as at least one exchange source game item, at least one of the exchange object game items corresponding to the at least one game exchange source game item recorded in the game item exchange table, as the at least one exchange object game item.

4. A game device according to claim 1, wherein the exchange object game item determination means determines, using the at least one game item selected by the game item selection means as at least one exchange source game item, at least one of the exchange object game items corresponding to the at least one exchange source game item recorded in the game item exchange table, as the at least one exchange object game item.

5. A game device according to claim 1, wherein the state judgement means judges that the game device is in the game item exchange state when the game device is connected to other game device for communication, and the other game device is in a game item exchange state.

6. A game device according to claim 1, wherein the exchange object game item determination means includes game item exchange time counting means for counting a number of times where the game item exchange means exchanges game items, and determines the at least one exchange object game item based on the number of times.

7. A game device according to claim 1, wherein the exchange object game item determination means includes random number generation means for generating a random number, and determines the at least one exchange object game item based on the random number generated.

8. A control method for a game device, comprising:

storing game items owned by a game character in a memory of said device;

judging by said device whether or not a game is in a game item exchange state;

selecting, in response to a judgement result, that a game is in a game item exchange state, at least one of the game items stored in the memory;

determining at least one exchange object game item according to a game item exchange table in which an exchange source game item corresponds to at least one exchange object game item; and storing the at least one exchange object game item in the memory in a place of at least one game item selected.

9. An information storage medium storing a program for having a computer to execute:

a game item storing step of storing a game items owned by a game character in a memory;

a state judging step of judging whether or not a game is in a game item exchange state;

a game item selecting step of selecting, in response to a judgement result that a game is in a game item exchange state, at least one of the game items stored in the memory;

an exchange object game item determining step of determining at least one exchange object game item according to a game item exchange table in which an exchange source game item corresponds to at least one exchange object game item; and a game item exchanging step of storing the at least one exchange object game item in the memory in a place of the at least one game item selected in the game item selecting step.

10. A game device, comprising:

a game item storage for storing a game items owned by a game character;

a state judgement portion for judging whether or not a game is in a game item exchange state;

a game item selector for selecting, in response to a judgement result that the game is in a game item exchange state, at least one of the game items stored in the game item storage means;

a table storage for storing a game item exchange table in which an exchange source game item corresponds to at least one exchange object game item;

an exchange object game item determiner for determining at least one exchange object game item according to the game item exchange table; and a game item exchanger for storing the at least one exchange object game item determined in the game item storage means in a place of the at least one of the game item selected by the game item selector.

\* \* \* \* \*